(12) United States Patent
Asama et al.

(10) Patent No.: US 7,486,800 B2
(45) Date of Patent: Feb. 3, 2009

(54) ACTION ANALYSIS METHOD AND SYSTEM

(75) Inventors: Hajime Asama, Wako (JP); Atsushi Morimoto, Nakano-ku (JP); Masaomi Nishimura, Nagareyama (JP)

(73) Assignee: Riken, Saitama (JP)

( * ) Notice: Subject to any disclaimer, the term of this patent is extended or adjusted under 35 U.S.C. 154(b) by 679 days.

(21) Appl. No.: 11/088,839

(22) Filed: Mar. 25, 2005

(65) Prior Publication Data

US 2005/0254687 A1    Nov. 17, 2005

(30) Foreign Application Priority Data

Mar. 25, 2004 (JP) ............................. 2004-089532

(51) Int. Cl.
*G06K 9/00* (2006.01)
(52) U.S. Cl. ....................... 382/103; 348/350
(58) Field of Classification Search ................ None
See application file for complete search history.

(56) References Cited

U.S. PATENT DOCUMENTS 5,629,735 A * 5/1997 Kaneda et al. .............. 348/350

OTHER PUBLICATIONS

Advances in Cooperative Multi-Sensor Video Surveillance (Darpa Image Understanding Workshop, Morgan Kaufmann, Nov. 1998, pp. 3-24.).*

Kandade, Takeo et al., Advances in Cooperative Multi-Sensor Video Surveillance, vol. 1, Sec. 1—VSAM—Principal Surveillance Reports, pp. 3-24.

Konolige, Kurt G. et al, Extra Sets of Eyes, vol. 1, Sec. 1—VSAM—Principal Surveillance Reports, pp. 25-32.

Grimson, W.E.L. et al., Forest of Sensors: Using adaptive tracking to classify and . . . , vol. 1, Sec. 1—VSAM—Principal Surveillance Reports, pp. 33-41.

Brown, Christopher et al., Image Understanding Research at Rochester, vol. 1, Sec. 1—VSAM—Principal Surveillance Reports, pp. 43-49.

Fujiyoshi, Hironobu et al., VASM: Video Surveillance and Monitoring Project, pp. 1-8.

* cited by examiner

*Primary Examiner*—Matthew C Bella
*Assistant Examiner*—Claire Wang
(74) *Attorney, Agent, or Firm*—Griffin & Szipl, P.C.

(57) ABSTRACT

An action analysis method comprising: an image recording step for continuously photographing a target; a movement locus measuring step for obtaining a movement locus of the target; an action analysis step for analyzing an action of the target from the movement locus; and an output step. In the action analysis step, a speed v and a movement direction displacement angle $\theta$ for each unit time is obtained from the movement locus; an average value X of $v \cdot \cos \theta$ for each unit time within a predetermined time is obtained; and a predetermined extraction target is distinguished by a statistic measure using the average value as an operation element index.

8 Claims, 10 Drawing Sheets

2 — FLOOR FACE

PERSPECTIVE IMAGE
INNER COORDINATE

GLOBAL
COORDINATE

FLOOR FACE

EXAMPLE 1 OF INSIDER

EXAMPLE 2 OF INSIDER

EXAMPLE OF VISITOR

EXAMPLE IN WHICH VISITOR IS
WRONGLY IDENTIFIED AS INSIDER

ACTION ANALYSIS METHOD AND SYSTEM

This application claims priority from Japanese Patent Application No. 2004-089532, filed Mar. 25, 2004, the entire disclosure of which is incorporated herein by reference.

BACKGROUND OF THE INVENTION

1. Field of the Invention

The present invention relates to an action analysis method and system for distinguishing a visitor from an insider by an action of an object (person, animal, or moving object) or for distinguishing a suspicious person.

2. Description of the Related Art

In recent years, expectations on researches concerning a video monitoring system have risen accompanying a rapid increase of crime incidence. As to conventional video monitoring systems, there are many systems in which monitoring camera videos are recorded or a watchman simultaneously monitors a plurality of camera videos.

On the other hand, in the U.S., a research project video surveillance and monitoring (VSAM) of the video monitoring system has been performed using an image understanding technique (Non-Patent Document 1). In this system, as described also in Non-Patent Document 2, a plurality of cameras cooperate with one another to track an invading object detected by a dynamic image understanding technique, and a situation is presented to the watchman in real time.

[Non-Patent Document 1]

VSAM: "Section I, video surveillance and monitoring", Proc. of the 1998 DARPA Image Understanding Workshop, Vol. 1, pp. 1 to 44 (Nov. 1998).

[Non-Patent Document 2]

Hirotsune Fujiyoshi, Takeo Kanaide, "VSAM: concerning video monitoring system project using image understanding technique", 2001

When a service desired by a person is presented to the person, it is important to observe a condition of the person. For example, in a guidance service, it is effective to detect user's position information, analyze the action, and estimate a situation of the user.

In the above-described conventional video monitoring system, the action itself of the person, animal, or moving object (hereinafter referred to simply as a "target") can be monitored, but meaning of the action of the target cannot be grasped. Therefore, for example, to distinguish a visitor from an insider in accordance with the action, or distinguish a suspicious person, judgment of a monitoring person who has a great deal of experience is required, and there has been a problem that the distinction cannot be automatically performed in an unmanned manner.

SUMMARY OF THE INVENTION

The present invention has been developed in order to solve the problems. That is, an object of the present invention is to provide an action analysis method and system capable of automatically distinguishing a visitor from an insider in accordance with an action of a target in an unmanned manner, or distinguishing a suspicious person.

According to the present invention, there is provided an action analysis method comprising: an image recording step for continuously photographing a target moving on a predetermined floor face to record image data; a movement locus measuring step for obtaining a movement locus of the target from the image data; an action analysis step for analyzing an action of the target from the movement locus; and an output step for outputting an analysis result.

Moreover, according to the present invention, there is provided an action analysis system comprising: an image recording apparatus for continuously photographing a target moving on a predetermined floor face to record image data; a movement locus measuring apparatus for obtaining a movement locus of the target from the image data; an action analysis apparatus for analyzing an action of the target from the movement locus; and an output apparatus for outputting an analysis result.

According to the method and system of the present invention, the movement locus can be automatically obtained from the image data obtained by continuously photographing the object which moves on the predetermined floor face in the unmanned manner. The action of the object can be automatically analyzed from the movement locus in the unmanned manner. Therefore, the visitor can be automatically distinguished from the insider in accordance with the action of the target in the unmanned manner, or the suspicious person can be distinguished.

According to a preferable embodiment of the present invention, a background image excluding the target is stored beforehand, the background image is subtracted from the image data to obtain a difference image, and the movement locus is obtained using an intersection between a lower end of the difference image and the floor face as a position of the target in the movement locus measuring step by the movement locus measuring apparatus.

By this means, a three-dimensional position of the target which acts on the predetermined floor face can be specified from two-dimensional image data by simple image processing.

By the movement locus measuring apparatus, in the action analysis step, a speed v and a movement direction displacement angle $\theta$ for each predetermined unit time are obtained from the movement locus, an average value X of $v \cdot \cos \theta$ for each unit time is obtained within a predetermined time, and a predetermined distinction target is distinguished by statistic means using the average value as an operation element index.

Since the predetermined distinction target (visitor or suspicious person) generally hangs around, the average value X of $v \cdot \cos \theta$ is reduced. Since the insider other than the distinction target usually heads for an intended direction fast, the average value X increases. Therefore, when the average value X is used as an operation element index, the predetermined distinction target can be distinguished with good precision.

When there is a difference between distribution of the average value X of the predetermined distinction target and that of the average value X of a target other than the distinction target, in the statistic means, the respective distributions are approximated with functions $f_v(X)$ and $f_s(X)$, an occurrence probability $p(v)$ of the distinction target, and an occurrence probability $p(s)$ of the target other than the distinction target are obtained beforehand.

A probability $p(v|X=xi)$ of the distinction target and a probability $p(s|X=xi)$ of the target other than the distinction target are calculated from a measured value $X=xi$ by Bayes' theorem, and it is judged by a magnitude of the probability whether or not the target is the distinction target.

It has been found that the average value can be approximated by a normal distribution in an embodiment described later. Since the occurrence probability $p(v)$ of the distinction target and the occurrence probability $p(s)$ of the target other than the distinction target can be obtained from past achievement or the like beforehand, the probabilities of the distinction target and the target other than the distinction target can be easily calculated by the Bayes' theorem. Calculation results are compared with each other, and a result having a larger probability is selected. It has been confirmed by the embodiment described later that the predetermined distinction target can be distinguished with good precision.

As described above, the action analysis method and system of the present invention have a superior effect that the visitor can be automatically distinguished from the insider in accordance with the action of the target in the unmanned manner, or the suspicious person can be distinguished.

Other objects and advantageous characteristics of the present invention will be apparent from the following description with reference to the accompanying drawings.

DESCRIPTION OF THE PREFERRED EMBODIMENT

Figure 1:
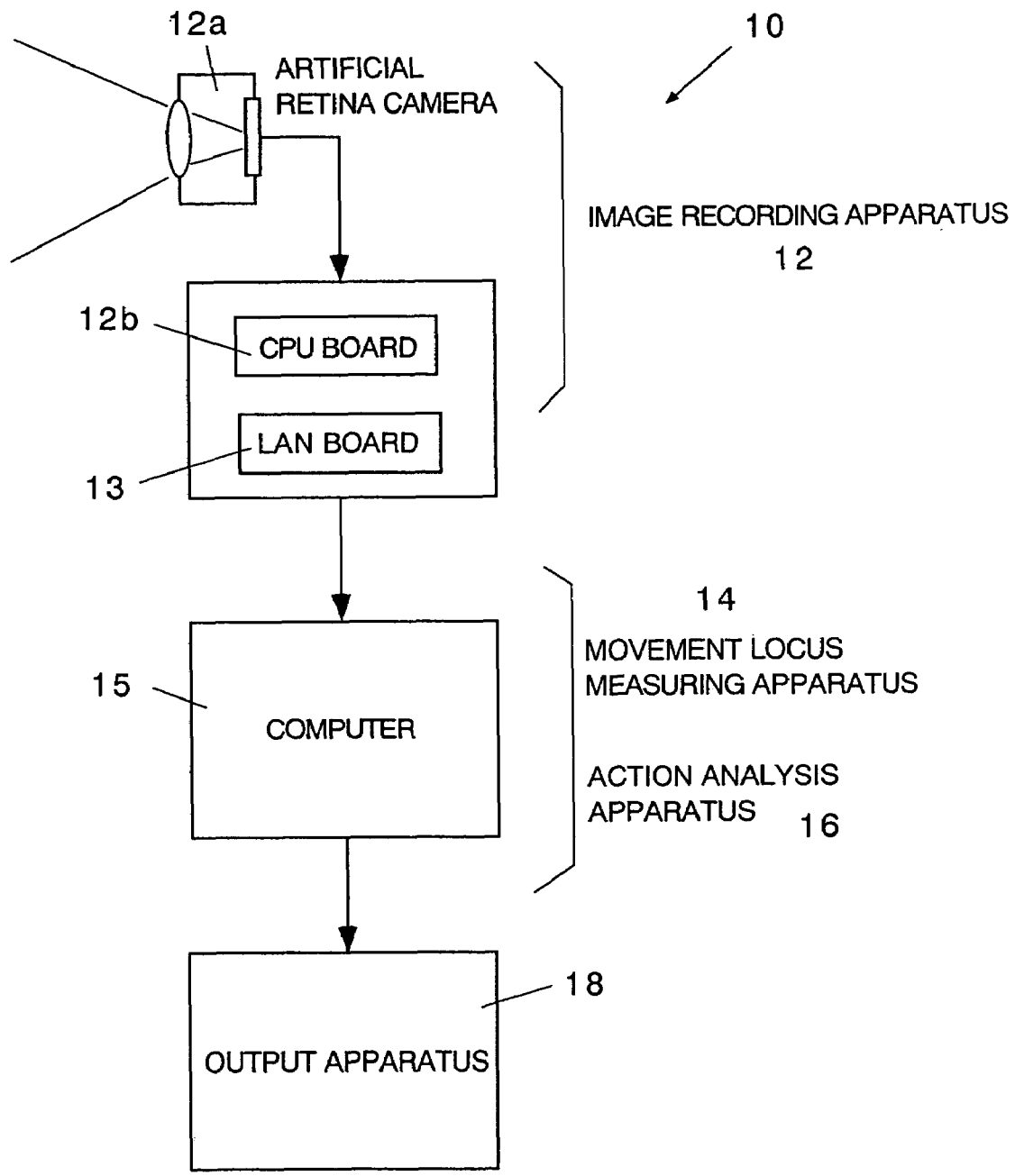
FIG. 1 is a whole constitution diagram of an action analysis system according to the present invention.

The present invention will be described hereinafter with reference to the drawings. It is to be noted that parts common to the respective drawings are denoted with the same reference numerals, and redundant description is omitted.

FIG. 1 is a whole constitution diagram of an action analysis system according to the present invention. As shown in the drawing, an action analysis system 10 of the present invention comprises an image recording apparatus 12, a movement locus measuring apparatus 14, an action analysis apparatus 16, and an output apparatus 18. It is to be noted that in the present invention, a target means a person, an animal, or a moving object.

The image recording apparatus 12 is constituted of, for example, an artificial retina camera 12a and a CPU board 12b, and continuously photographs a target's action to record image data. The image data may be acquired at a certain time interval (e.g., every second).

The movement locus measuring apparatus 14 and the action analysis apparatus 16 are constituted of, for example, a computer 15 network-connected to the image recording apparatus 12 via a LAN board 13. The computer 15 comprises a storage device, and stores a plurality of image data acquired by the image recording apparatus 12 together with a photographing time. The movement locus measuring apparatus 14 is a program stored in the computer 15, and obtains a movement locus of the target from the plurality of image data. The action analysis apparatus 16 is also a program stored in the computer 15, and analyzes the action of the target from the movement locus obtained by the movement locus measuring apparatus 14.

It is to be noted that the movement locus measuring apparatus 14 and the action analysis apparatus 16 may be realized by the CPU board 12b.

The output apparatus 18 is, for example, a CRT apparatus, a printer, an alarm device or the like connected to the computer 15, and outputs an analysis result.

Figure 2:
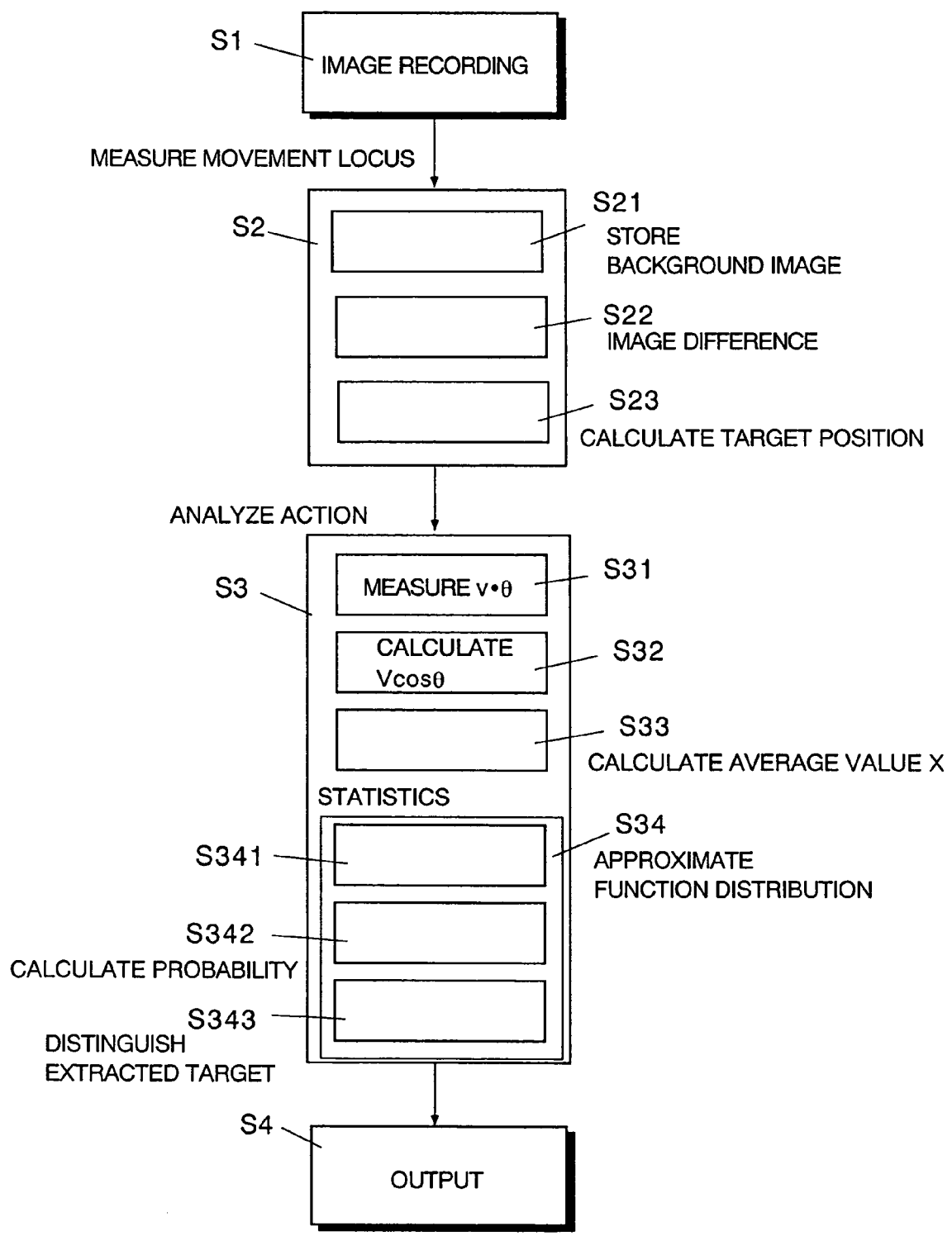
FIG. 2 is a whole flowchart of an action analysis method according to the present invention.

FIG. 2 is a whole flowchart of the action analysis method according to the present invention. As shown, the action analysis method of the present invention is constituted of an image recording step S1, a movement locus measuring step S2, an action analysis step S3, and an output step S4.

In the image recording step S1, the action of the target is photographed with elapse of time to record the image data. In the movement locus measuring step S2, the movement locus of the target is obtained from the image data. In the action analysis step S3, the action of the target is analyzed from the movement locus. In the output step S4, the analysis result is output.

In FIG. 2, the movement locus measuring step S2 is constituted of a background image storage step S21 of storing a background image excluding an object beforehand; an image difference step S22 of differentiating the background image from the image data to obtain a difference image, and a target position calculation step S23 of obtaining the movement locus using an intersection between a lower end of the difference image and a floor face as a position of the target.

Moreover, the action analysis step S3 has a v·θ calculation step S31 of obtaining a speed v and a movement direction displacement angle θ for each predetermined unit time from the movement locus, a v·cos θ calculation step S32 of calculating v·cos θ for each unit time in a predetermined time, an average value X calculation step S33 of obtaining the average value X, and a statistic step S34 of distinguishing a predetermined distinction target using the average value as an operation element index.

The statistic step S34 is constituted of: a function approximation step S341 of approximating distributions with functions $f_v(X)$ and $f_s(X)$ in a case where there is a distribution difference between the average value X of a predetermined distinction target and that of a target other than the distinction target; a probability calculation step S342 of obtaining an occurrence probability p(v) of the distinction target and an occurrence probability p(s) of the target other than the distinction target beforehand, and calculating a distinction target probability p(v|X=xi) and a probability p(s|X=xi) of the target other than the distinction target from a measured value X=xi by Bayes' theorem; and a distinction target distinguishing step S343 of distinguishing by a magnitude of the probability whether or not the target is the distinction target.

EXAMPLE 1

An example of the present invention will be described hereinafter. It is to be noted that in this example, a target means people, and is divided into an insider and a visitor.

1. In these days, it has been difficult for a person to find optimum information, and there has been a demand for an environment in which useful information can be presented to a user if necessary. To present the useful information in real time on an environment side, user's situation and movement need to be correctly detected. In the present invention, a system for analyzing an action from a user's movement locus will be proposed in accordance with an example of guidance service which is a simple service.

Examples of means for detecting position information include the use of GPS, and there has been a problem that the user cannot be tracked from an obstacle and the like indoors in real time. Even when position information is acquired, presentation of the data is focused on, and any method of analyzing the action is not posted on. To solve the problem, in the present invention, user's position information is detected by which the user can be led even in a narrow range (in a building) and the user can be tracked in real time. The user's action is analyzed from the movement locus.

2. Requirement

With regard to real-time tracking indoors, there has been a problem that there is an error of positional precision, or the position cannot be exactly acquired by the obstacle or the like. In the present invention, user's action can be exactly distinguished even indoors, and user's movement is tracked using image processing based on a camera. To provide a guidance service to a person, it is considered that the person can easily receive information such as image and sound in a periphery of about 400 mm. Therefore, a position detection system is required to be capable of detecting the person with an error of 400 mm or less.

3. Proposed Means 3.1 Sensing Means

Figure 3:
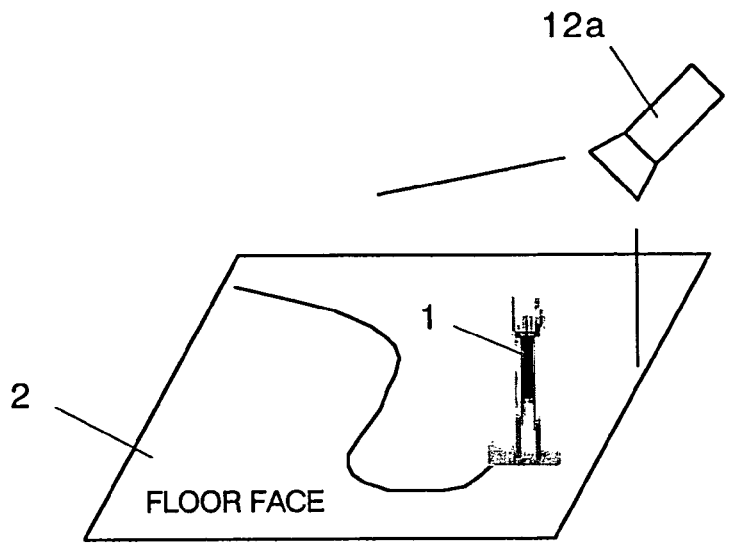
FIG. 3 is a schematic diagram showing image recording means in the present invention.
Figure 4:
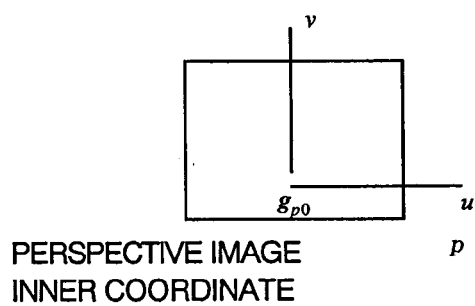
FIG. 4 is a schematic diagram of coordinate conversion.
Figure 4:
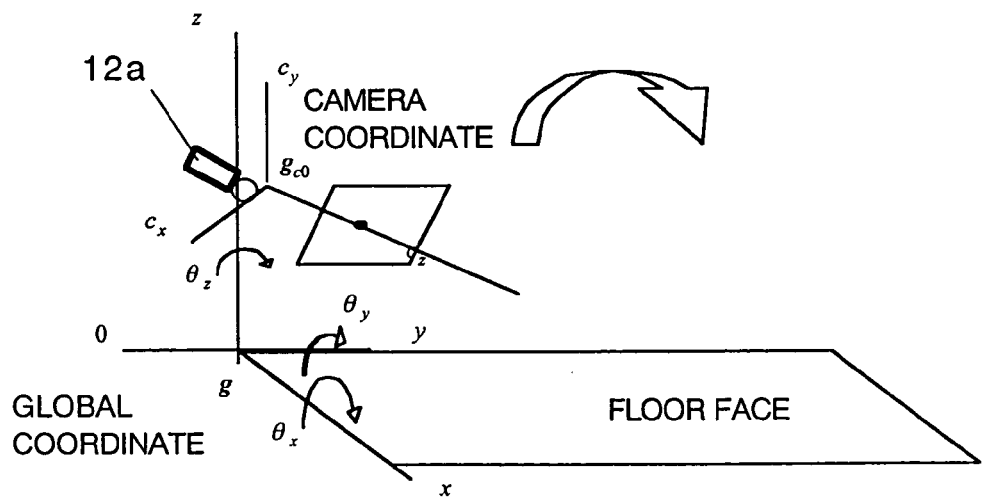
Figure 5:
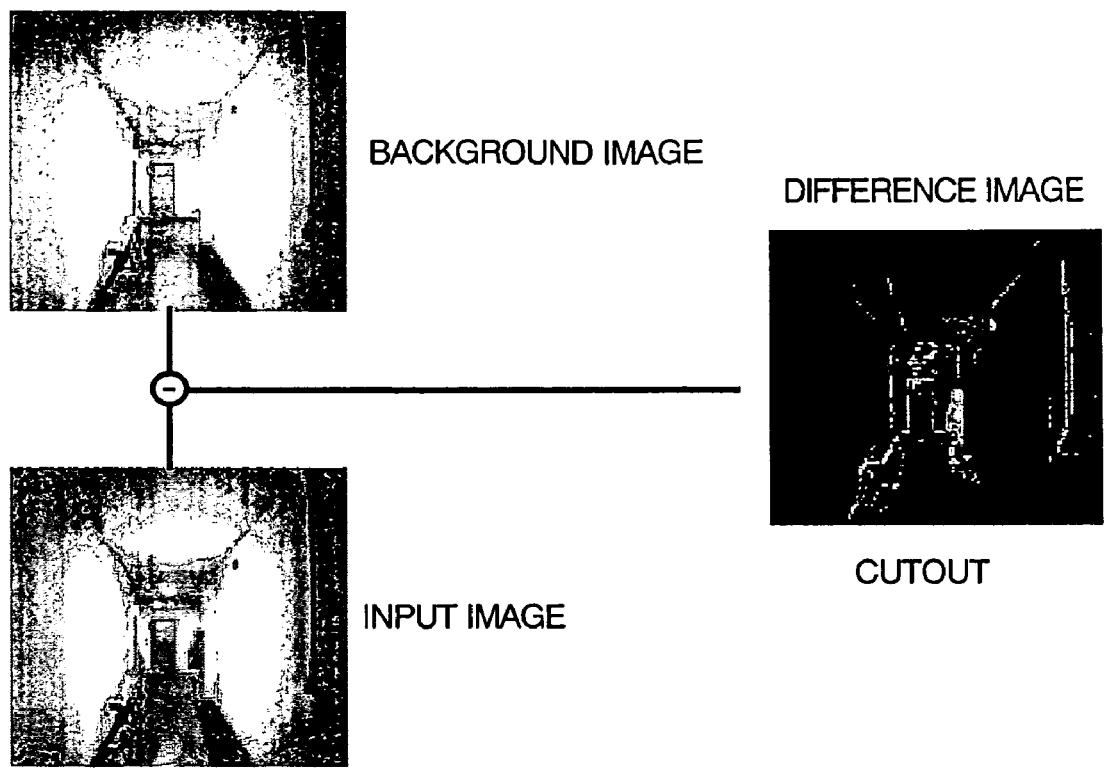
FIG. 5 is a concrete example of a background difference process.

FIG. 3 is a schematic diagram showing image recording means in the present invention, FIG. 4 is a schematic diagram of coordinate conversion, and FIG. 5 is a concrete example of a background difference process.

In FIG. 3, one parameter is lacking for extracting three-dimensional position information (x, y, z) from a coordinate (u, y) on a two-dimensional image obtained by a camera 12a, and depth is not obtained. Then, it is noted that movement of a target 1 (user) indoors is performed on a floor face 2, it is assumed that a lowest point of a moving object on the image is z=0 in a global coordinate system of FIG. 4, user's feet indicating z=0 are detected by the background difference process of FIG. 5, and accordingly user's three-dimensional position information is detected utilizing coordinate change.

After detecting the feet, assuming that a distance between an origin of a camera coordinate system and an origin of the global coordinate system is h, and rotation angles of an x-axis, y-axis, and z-axis are θx, θy, θz, a position of the moving object in the global coordinate system (x, y, z) is detected by equation (1).

[eq.1]

$$\begin{pmatrix} x \\ y \\ 0 \end{pmatrix} = c_z K_c \begin{pmatrix} m_0 u \\ n_0 v \\ 1 \end{pmatrix} + \begin{pmatrix} 0 \\ 0 \\ h \end{pmatrix} \quad (1)$$

$$K_c = \begin{pmatrix} \cos\theta_z & \sin\theta_z & 0 \\ -\sin\theta_z & \cos\theta_z & 0 \\ 0 & 0 & 1 \end{pmatrix} \begin{pmatrix} \cos\theta_y & 0 & \sin\theta_y \\ 0 & 1 & 0 \\ -\sin\theta_y & 0 & \cos\theta_y \end{pmatrix} \begin{pmatrix} 1 & 0 & 0 \\ 0 & \cos\theta_x & \sin\theta_x \\ 0 & -\sin\theta_x & \cos\theta_x \end{pmatrix}$$

3.2 Action Analysis

Figure 6A:
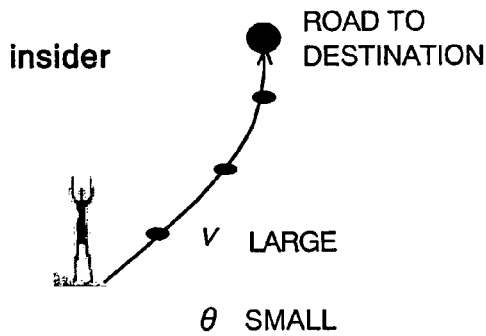
FIGS. 6A, B, C are schematic diagrams of action patterns of a target.
Figure 6B:
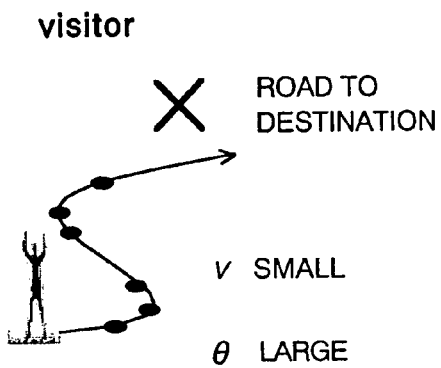
Figure 6C:
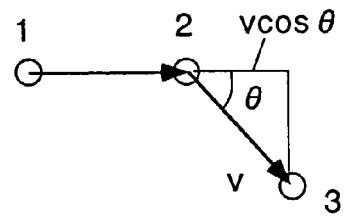
Figure 7:
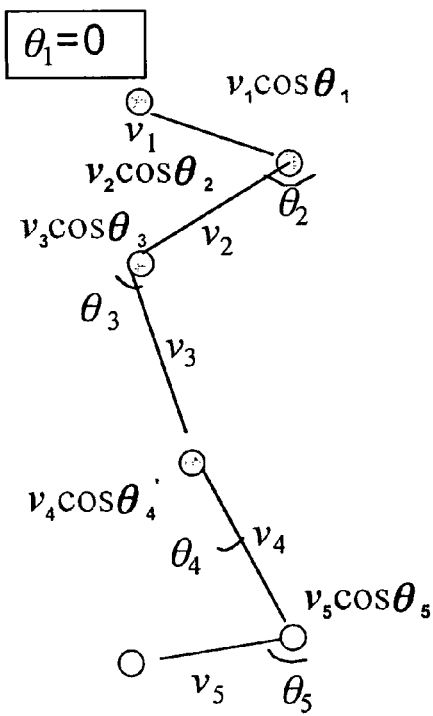
FIG. 7 is an explanatory view of an operation element index of a target.

FIGS. 6A, B, C are schematic diagrams of action patterns of a target, and FIG. 7 is an explanatory view of an operation element index of the target. As shown in FIGS. 6A, B, a predetermined distinction target (i.e., visitor or suspicious person) generally hangs around. On the other hand, an insider other than the distinction target usually heads fast for an intended direction without hanging around. Therefore, as shown in FIG. 6C, a target position is detected at a certain time interval (three points 1, 2, 3 in this example). Assuming that a speed and direction from the position 2 to 3 are v, θ, in general, as to the visitor or suspicious person, an average value X of v cos θ is generally reduced. As to the insider, the average value X increases.

Therefore, in the present invention, after detecting the position, the movement locus is decomposed into an operation element (v, θ) in order to handle an arbitrary time length, and the action patterns are compared by the movement. At this time, an operation element index X is defined as in equation (2).

[eq.2]

$$X = \frac{1}{n}\sum_{i=1}^{n} v_i \cos\theta_i \quad (2)$$

In a normal distribution of probability density functions $f_s(X)$, $f_v(X)$ of X of the insider and visitor, the assumed visitor is detected. $f_s(X)$, $f_v(X)$ are represented by equation (3).

[eq.3]

$$f_s(X) = \frac{1}{\sqrt{2\pi}\,\sigma_s} \exp\left\{\frac{-(X-\mu_s)^2}{2\sigma_s^2}\right\} \quad (3)$$

$$f_v(X) = \frac{1}{\sqrt{2\pi}\,\sigma_v} \exp\left\{\frac{-(X-\mu_v)^2}{2\sigma_v^2}\right\}$$

When X=xi is given, a posterior probability identifying the insider is defined as p(s|X=xi), a posterior probability identifying the visitor is defined as p(v|X=xi), the probabilities are compared with each other, and accordingly the visitor is detected.

4. Development of Person's Action Analysis System

A system is actually constructed, a preliminary experiment is performed, a parameter of action analysis is defined, a demonstrative experiment is performed, and analysis precision is verified. Here, a measurement target is only one person.

4.1 Experiment Environment

Figure 8:
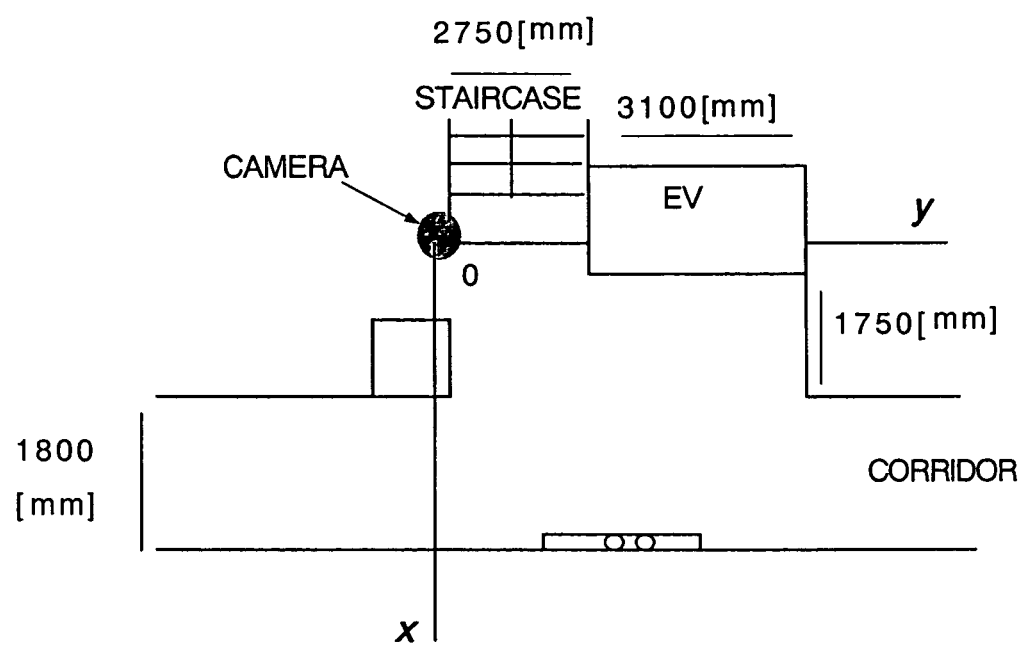
FIG. 8 is a plan view of an experiment place.

FIG. 8 is a plan view of an experiment place. This experiment was performed in a corridor before an elevator in a university.

Figure 9A:
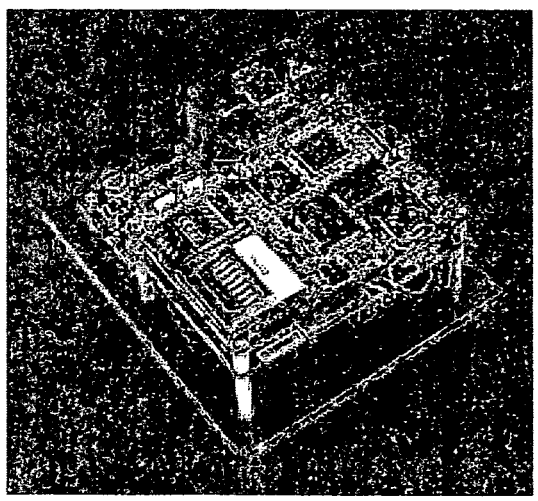
FIGS. 9A, B show an appearance photograph of a micro server and an actually acquired image.
Figure 9B:

FIG. 9A shows an appearance photograph of µT-Engine which was manufactured by Mitsubishi Electric Corp. and which was used as a ubiquitous device for acquiring an image, and FIG. 9B shows an actually acquired image.

This micro server comprises a CPU board, extended LAN board, artificial retina camera and the like. The server was connected to another PC via radio LAN, and used. An error by resolution of the artificial retina camera is 300 mm at maximum in a vertical direction, and 69 mm in a horizontal direction in a measurement range. This satisfied precision required for the system. It is to be noted that data of specifications of the CPU board, extended LAN board, and artificial retina camera are shown in Table 1.

TABLE 1

| CPU board | |
|---|---|
| CPU | Mitsubishi Electric Corp., M32104 (M32R, internal clock 216 MHz) |
| Flash memory | 4 M bytes |
| SDRAM | 16 M bytes |
| Input/output I/F | Compact Flash(CF)card, serial, eTRON chip, MMC card, (two) LEDs, extended bus I/F |
| Other functions | RTC |
| Power supply | AC adaptor |
| Outer shape dimension | 60 nm × 85 nm (excluding protrusions) |
| Extended LAN board | |
| LAN | LAN controller manufactured by SMSC Corp. (LAN91C111) 100BASE-TX/10BASE-T |
| Connector | SDI connector (connected to SDI debugger) RJ-45 connector for LAN Connector for AR board Parallel interface(8-bit port input/output) |
| Outer shape dimension | 60 mm × 85 mm (excluding protrusions) |
| AR board/artificial retina camera | |
| Resolution | 160 × 144 × 3 (RGB) |
| Others | Lens integrated package CDS, AGC, gamma correction, tone correction circuit built-in gain level, black level adjustment function built-in |
| Outer shape dimension | 40 mm × 35 mm (excluding protrusions) |
| Power board | |
| Outer shape dimension | 40 mm × 35 mm (excluding protrusions) |

4.2 Preliminary Experiment

The number of samples acquired for a preliminary experiment was 155 (people). Among them, insiders included 56 students and instructors, 66 secretaries, and 5 cleaners, and visitors included 12 visitors, 15 meeting participants, and one elevator inspector.

Figure 10A:
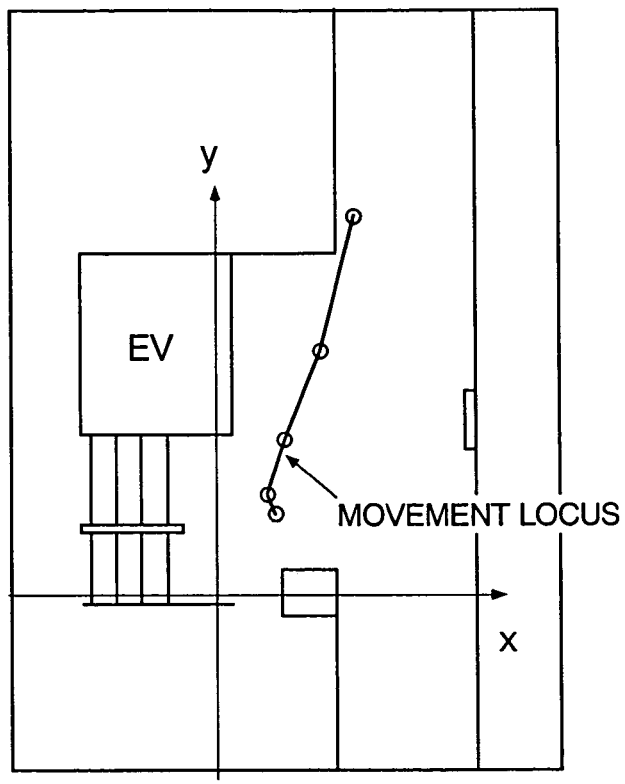
FIGS. 10A, B show movement locus examples of an insider.
Figure 10B:
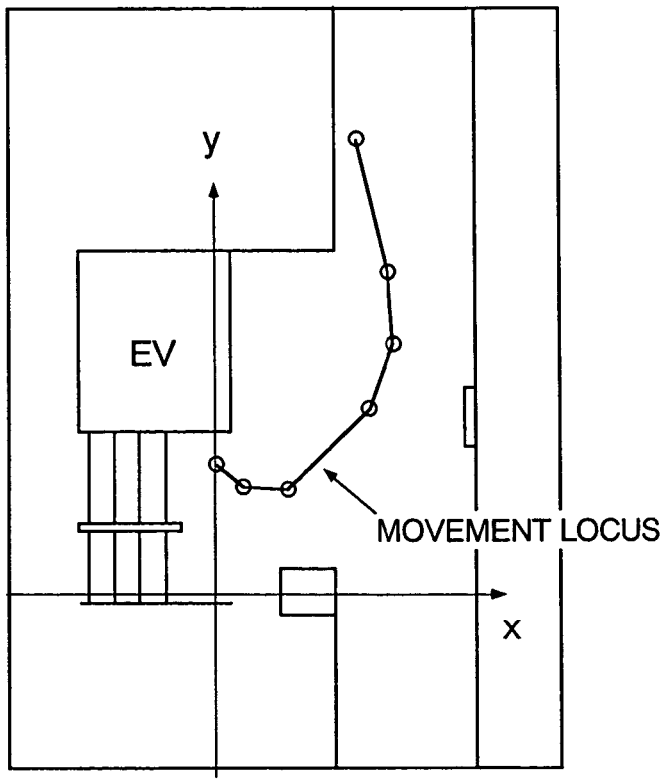
Figure 11:
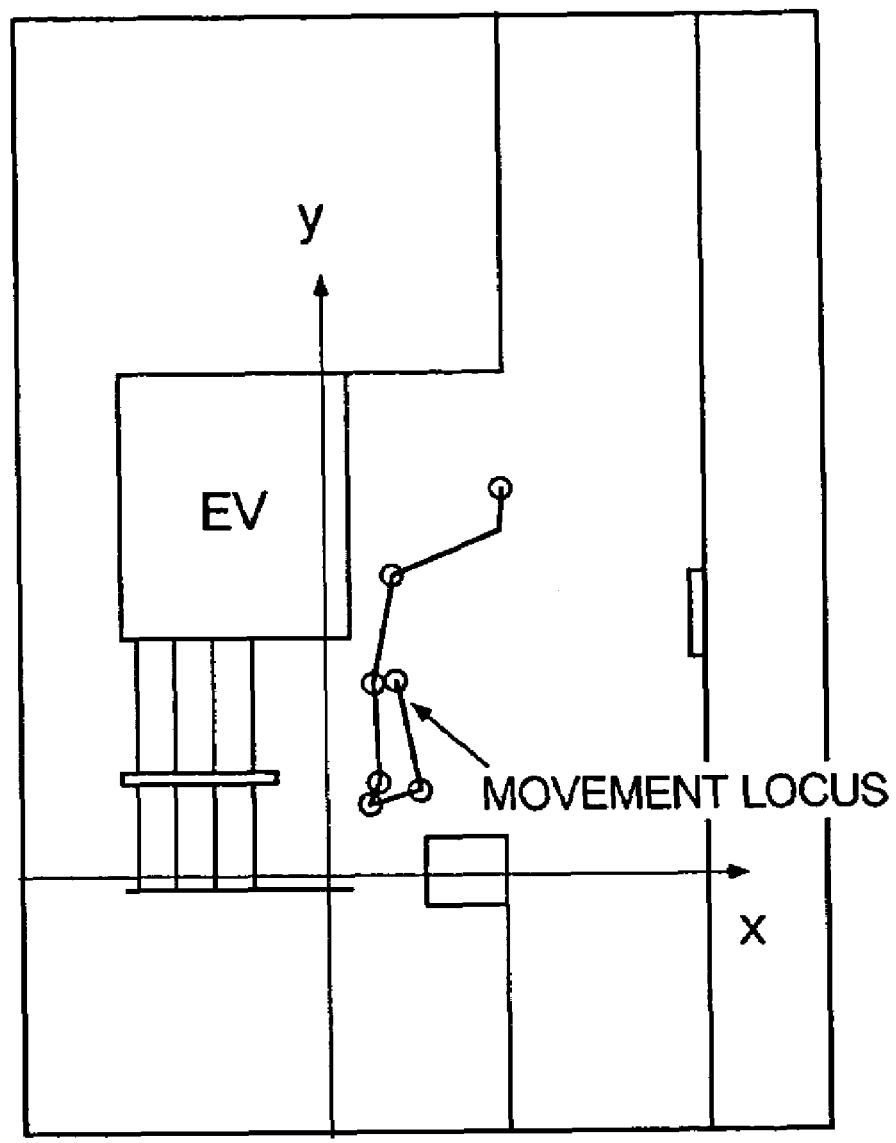
FIG. 11 shows a movement locus example of a visitor.

FIGS. 10A, B show movement locus examples of the insider, and FIG. 11 shows an example of the visitor. As seen from these drawings, the assumption that the visitor generally hangs around whereas the insider usually heads fast for the intended direction without hanging around is correct.

Figure 12A:
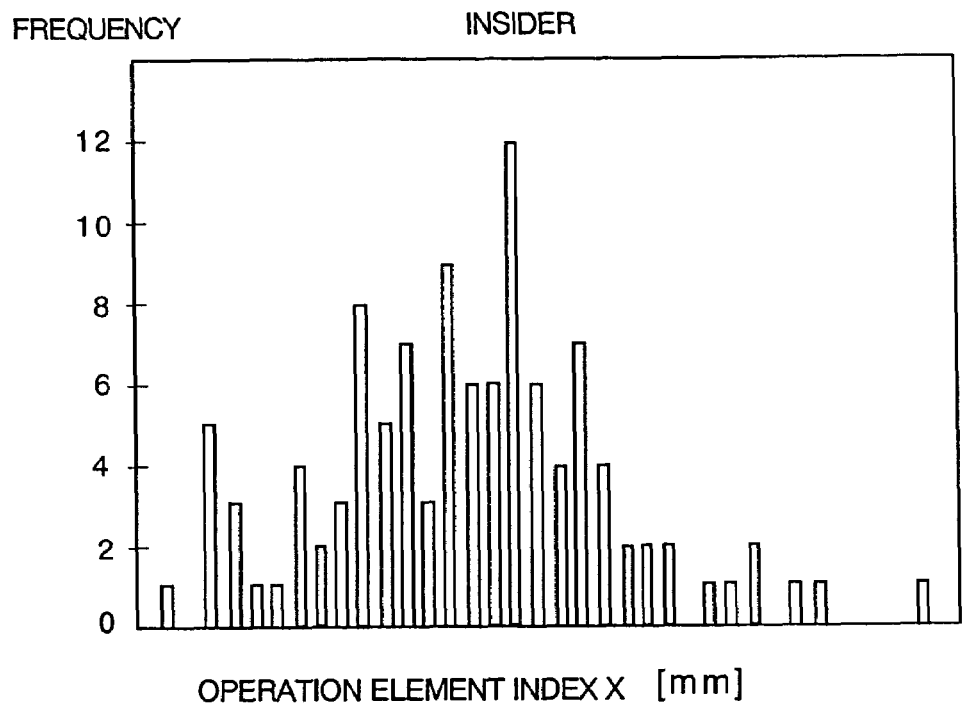
FIGS. 12A, B show measured values of operation element indexes X and frequencies of the insider and visitor.
Figure 12B:
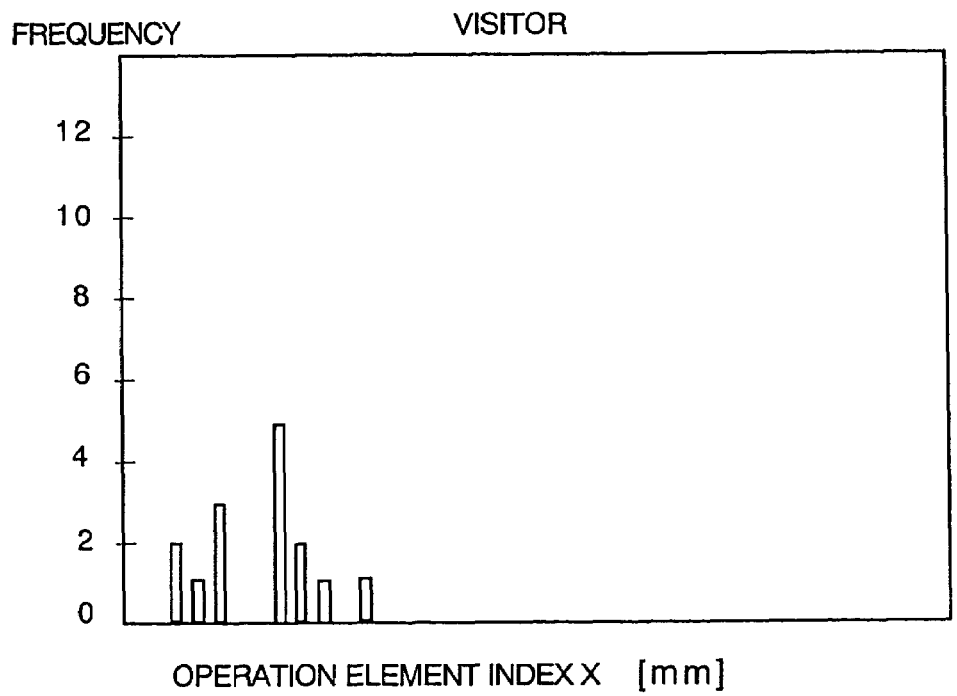
Figure 13:
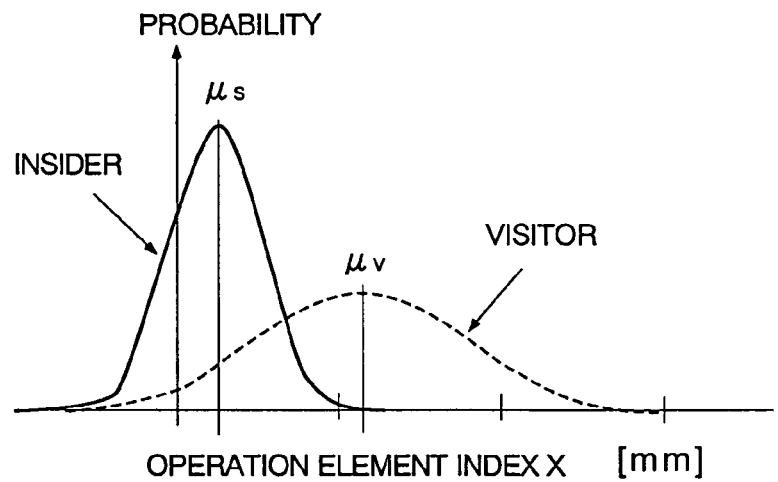
FIG. 13 is a normal distribution diagram of the operation element index X.

FIGS. 12A, B show measured values of operation element indexes X and frequencies of the insider and visitor. When it is assumed from these drawings that operation element indexes X are normally distributed with respect to the insider and visitor, as shown in FIG. 13, average values μs=1135, μv=237, and standard deviations σs=656, σv=270 are obtained.

These values are substituted into equation (4), and posterior probabilities p(s|X=xi), p(v|X=xi) are derived. Here, a=128 indicates the number of insiders, b=27 indicates the number of visitors, and a ratio p(v) of a distinction target and a ratio p(s) of a target other than the distinction target are b/(a+b), b/(a+b), respectively.

[eq.4]

$$p(s \mid X = x_i) = \frac{p(s) f_s(X = x_i)}{p(s) f_s(X = x_i) + p(v) f_v(X = x_i)} \quad (4)$$

$$p(v \mid X = x_i) = \frac{p(v) f_v(X = x_i)}{p(s) f_s(X = x_i) + p(v) f_v(X = x_i)}$$

4.3 Demonstrative Experiment

The number of samples acquired for a demonstrative experiment was 55 (people), 45 insiders included 23 students and instructors, 20 secretaries, and 2 cleaners, and there were ten visitors.

An average value X=xi of these targets was obtained, a value of X was substituted into a posterior probability equation obtained by a preliminary experiment, the values were compared with each other, and the visitors were detected. That is, a probability p(v|X=xi) of the obtained distinction target, and a probability p(s|X=xi) of a target other than the distinction target were calculated, and a larger probability was selected.

4.4 Experiment Result

It was possible to distinguish a visitor with an identification ratio of 90%, and an insider with 95.6%. There was a 10% first type of mistake indicating that the visitor was wrongly identified as the insider, 9 people of 10 people were correct, and one person was incorrect. There was a 4.4% second type of mistake indicating that the insider was wrongly identified as the visitor, 43 people of 45 people were correct, and two people were incorrect.

The first type of mistake indicating that the visitor or suspicious person is identified as the insider is especially important, this wrong identification ratio remains at 10%, and validity of the system can be verified.

The second type of mistake indicating that the insider is mistaken for the visitor is permitted in action analysis of guidance, but the first type of mistake indicating that the visitor who is a target of guidance cannot be detected is not preferable, and therefore there has been a demand for improvement for further lowering this value.

Figure 14:
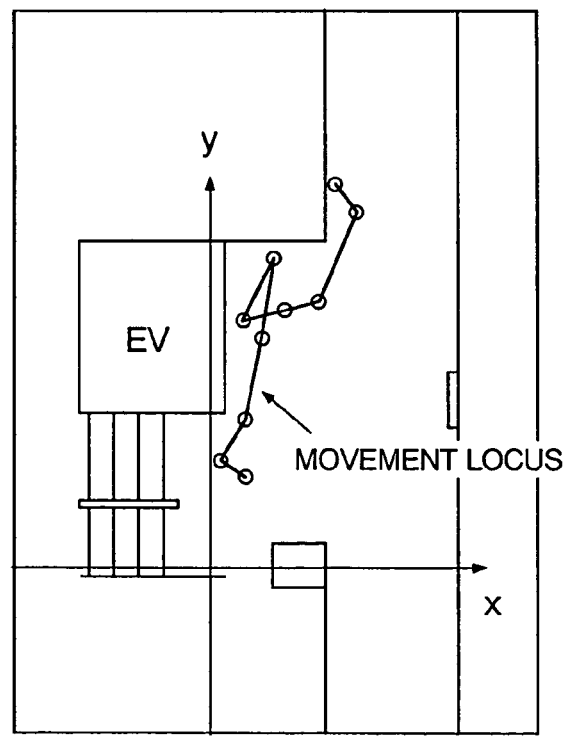
FIG. 14 shows a movement locus example in which the visitor is distinguished as the insider.

FIG. 14 shows an example in which the visitor is distinguished as the insider. In this case, although the target is the visitor, the operation element index X increases with respect to a part of the action. As a result, it can be presumed that the first type of mistake is generated. Therefore, a plurality of average values X (operation element indexes) are acquired while time is shifted. For example, it is considered that by the use of a minimum value among the values, this mistake is reduced, and accuracy can be further enhanced.

It is to be noted that the present invention is not limited to the above-described embodiment or example, and, needless to say, the present invention can be variously changed without departing from the scope of the present invention.

What is claimed is:

1. An action analysis method comprising:
   an image recording step for continuously photographing a target moving on a predetermined floor face to record image data;
   a movement locus measuring step for obtaining a movement locus of the target from the image data;
   an action analysis step for analyzing an action of the target from the movement locus and
   an output step for outputting an analysis result;
   wherein the action analysis step comprises
   obtaining a speed v and a movement direction displacement angle θ for each predetermined unit time from the movement locus,
   obtaining an average value X of v·cos θ for each unit time within a predetermined time, and distinguishing a predetermined distinction target by statistic means using the average value as an operation element index.

2. The action analysis method according to claim 1, wherein
the statistic means approximates distributions with functions $f_v(X)$ and $f_s(X)$ in a case where there is a difference between distribution of the average value X of the predetermined distinction target and that of the average value X of a target other than the distinction target;
obtains an occurrence probability p(v) of the distinction target, and an occurrence probability p(s) of the target other than the distinction target beforehand;
calculates a probability p(v|X=xi) of the distinction target and a probability p(s|X=xi) of the target other than the distinction target from a measured value X=xi by Bayes' theorem; and
judges by a magnitude of the probability whether or not the target is the distinction target.

3. An action analysis system comprising:
an image recording apparatus for continuously photographing a target moving on a predetermined floor face to record image data;
a movement locus measuring apparatus for obtaining a movement locus of the target from the image data;
an action analysis apparatus for analyzing an action of the target from the movement locus; and
an output apparatus for outputting an analysis result;
wherein
the movement locus measuring apparatus obtains a speed v and a movement direction displacement angle θ for each predetermined unit time from the movement locus;
obtains an average value X of v·cos θ for each unit time within a predetermined time; and
distinguishes a predetermined distinction target by statistic means using the average value as an operation element index.

4. The action analysis system according to claim 3, wherein the statistic means approximates distributions with functions $f_v(X)$ and $f_s(X)$ in a case where there is a difference between distribution of the average value X of the predetermined distinction target and that of the average value X of a target other than the distinction target;
obtains an occurrence probability p(v) of the distinction target, and an occurrence probability p(s) of the target other than the distinction target beforehand;
calculates a probability p(v|X=xi) of the distinction target and a probability p(s|X=xi) of the target other than the distinction target from a measured value X=xi by Bayes' theorem; and
judges by a magnitude of the probability whether or not the target is the distinction target.

5. The action analysis method according to claim 1, wherein the movement locus measuring step comprises the steps of:
storing a background image excluding the target beforehand;
subtracting the background image from the image data to obtain a difference image; and
obtaining the movement locus using an intersection between a lower end of the difference image and the floor face as a position of the target.

6. The action analysis method according to claim 2, wherein the movement locus measuring step comprises the steps of:
storing a background image excluding the target beforehand;
subtracting the background image from the image data to obtain a difference image; and
obtaining the movement locus using an intersection between a lower end of the difference image and the floor face as a position of the target.

7. The action analysis system according to claim 3, wherein the movement locus measuring apparatus:
stores a background image excluding the target beforehand;
subtracts the background image from the image data to obtain a difference image;
obtains a position of the target using a lower end of the difference image, which is a point on the floor face; and
measures the movement locus as time series data.

8. The action analysis system according to claim 4, wherein the movement locus measuring apparatus:
stores a background image excluding the target beforehand;
subtracts the background image from the image data to obtain a difference image;
obtains a position of the target using a lower end of the difference image, which is a point on the floor face; and
measures the movement locus as time series data.

* * * * *